United States Patent
Henderson (10) Patent No.: US 6,712,614 B1
(45) Date of Patent: Mar. 30, 2004

(54) ABACUS CALCULATOR

(76) Inventor: Gerald J Henderson, 1432 Baffin Bay Dr., Plano, TX (US) 75023

( * ) Notice: Subject to any disclaimer, the term of this patent is extended or adjusted under 35 U.S.C. 154(b) by 292 days.

(21) Appl. No.: 09/778,492

(22) Filed: Feb. 7, 2001

(51) Int. Cl.[7] .................................................. G09B 9/02
(52) U.S. Cl. ........................................ 434/203; 434/202
(58) Field of Search ................................. 434/201, 202, 434/203, 204, 207, 189

(56) References Cited

U.S. PATENT DOCUMENTS

| | | | | |
|---|---|---|---|---|
| 3,633,287 | A | * 1/1972 | Squires et al. | 434/189 |
| 3,688,418 | A | * 9/1972 | Wilson | 434/203 |
| 4,217,656 | A | 8/1980 | Hirano et al. | 364/710 |
| D282,669 | S | 2/1986 | Conlee, Jr. | D18/6 |
| D284,975 | S | 8/1986 | Kwok | D18/2 |
| 4,713,009 | A | 12/1987 | Borenson | 434/188 |
| 4,812,124 | A | * 3/1989 | Colodner et al. | 434/203 |
| D309,165 | S | 7/1990 | Kaplan et al. | D21/106 |
| D310,094 | S | 8/1990 | Noguchi | D18/7 |
| 5,134,692 | A | * 7/1992 | Hiromori | 708/141 |
| 5,205,747 | A | 4/1993 | Tan | 434/203 |
| RE34,498 | E | 1/1994 | Ylitalo | 434/203 |
| 5,334,026 | A | 8/1994 | Ylitalo | 434/203 |
| 5,395,245 | A | 3/1995 | Heinz | 434/207 |
| 5,463,341 | A | 10/1995 | Karasawa | 327/219 |
| 5,645,431 | A | 7/1997 | Dreyfous | 434/195 |
| 5,725,380 | A | 3/1998 | Kennelly | 434/203 |
| 5,820,381 | A | 10/1998 | Dreyfous | 434/195 |
| 6,511,066 | B1 * | 1/2003 | Durrant | 273/148 R |

FOREIGN PATENT DOCUMENTS

| | | | | |
|---|---|---|---|---|
| CN | 86104461 | * | 1/1988 | G06C/1/00 |
| CN | 1026923 | * | 12/1994 | G06C/1/00 |
| CN | 1223401 | * | 7/1999 | G06F/7/00 |
| JP | 55-066019 | * | 5/1980 | G06F/3/02 |
| JP | 58-132847 | * | 8/1983 | G06F/15/02 |
| JP | 60-068453 | * | 4/1985 | G06F/15/02 |
| JP | 63-273923 | * | 11/1998 | G06F/3/02 |

OTHER PUBLICATIONS

"Singapore Solution: If Johnnie Can't add, Give him an Abacus; Asians in the Calculator Age Bring Back The Old Device; Youngsters Like the Noise" Wall Street Journal Article, Retrieved from the Internet on [May 27, 2003]. URL<http://www.jamsportland.com/>.*

Pranevich, Joe. "Wonderful World of Linux 3.0 "AWE Edition"" Abacus World Expo. Oct. 18, 2000. Retrieved from the Internet [May 27, 2003] URL<http://www.abacus-worldexpo.com/abacusworldexpo/wwooflinux.html>.*

"Make an Abacus" Sep. 5, 1996. Retrieved from the Internet on May 27, 2003. URL<http://www.galaxy.net/~k12/math/abacus.shtml>.*

U.S. Scouting Service Project—Baloo's Bugle Word Abacus. Feb. 1999, Retrieved from the Internet on [May 27, 2003]. URL<http://www.usscouts.org/bbugle/bb9902/bbpuz.html>.*

* cited by examiner

*Primary Examiner*—Teresa Walberg
*Assistant Examiner*—Julie Brocketti
(74) *Attorney, Agent, or Firm*—F. Lindsey Scott (57) ABSTRACT

An electronic abacus calculator comprising an electronic abacus display screen in combination with a numeric display and an electronic keyboard calculator. The invention also comprises a personal abacus, which comprises a mechanical abacus or an electronic abacus calculator or both in a suitable carrying case, which is designed to open and make the abacus available for use in the case.

21 Claims, 10 Drawing Sheets

ABACUS CALCULATOR

FIELD OF THE INVENTION

This invention relates to an electronic abacus calculator comprising an electronic abacus display screen in combination with a numeric display and an electronic keyboard calculator. The invention further comprises a multi-abacus capable of use with a plurality of number base systems. The invention also comprises a personal abacus, which comprises a carrying case suitable to hold the electronic abacus calculator or a multi-base electronic calculator or a multi-base mechanical calculator or any combination thereof.

BACKGROUND OF THE INVENTION

The abacus has been well known for many years as a manual calculator for performing the four basic mathematical operations of addition, subtraction, multiplication and division. The abacus has commonly been available in two varieties, i.e., the Japanese variety and the Chinese variety. The Chinese abacus comprises a plurality of rods with each of the rods containing five beads in a first section, frequently referred to as the earth section, with two additional beads being positioned on each of the same rods in a second section referred to as the heaven section. In the operation of the abacus, the five beads represent unitary values in the first row with the beads on the same rod in the second section representing five units. In the heaven section, the second rod represents tens; the third rod represents hundreds and the like.

The Japanese abacus comprises four beads on a rod in a first (earth) section with a single bead on the same rod in the section. A plurality of rods is used. The beads in the first section represent unitary values with the bead of the second section representing five units. As in the Chinese abacus, the second rod represents tens; the third rod represents hundreds and the like. The operation of either type of abacus is well known to those skilled in the art for performance of the four basic mathematical operations described above.

The operation of the abacus results in the user becoming familiar with mathematical concepts of addition, subtraction, multiplication and division as a result of the operation of the beads to accomplish these objectives. Many individuals prefer to use an abacus for simple transactional calculations rather than electronic calculators. Unfortunately, abacuses are cumbersome to carry in the form in which they are normally produced. Further they are limited in that certain additional calculations such as the extraction of square root and the like are not normally done on an abacus. As a result, the use of abacuses has been limited to basically the four mathematical operations discussed above. This has limited the availability of abacuses to users for wider calculational application and it has limited their use as teaching tools because of the limited number of applications, which can be produced.

Typically abacuses of both types are produced with nine rods, although more rods could be used if desired for larger numbers. A further shortcoming of most abacuses is the limitation to base-10 calculations. While base-two calculations could be performed on either the Japanese or Chinese abacus, the use of other number-based systems is prohibited.

Accordingly, a continuing effort has been directed to the development of systems wherein the apparatus can be used as a teaching tool and can be available to those who prefer it in combination with other calculator systems in a system which can be readily transported and used by the individual. Both the electronic calculating abacus and the multi-base abacus are presented in combinations to make them more portable and easy to operate than the traditional mechanical Japanese or Chinese abacus.

SUMMARY OF THE INVENTION

The present invention comprises: an electronic abacus calculator, the calculator comprising: an electronic abacus display screen adapted to display an abacus comprising a plurality of rods bearing beads, the beads being separated into two or three portions on each rod by a divider(s) with each portion containing at least one bead, the beads being moveable on the rods to indicate at least one selected value on the abacus and to perform calculations on the abacus; a numeric display in communication with the electronic abacus display screen and adapted to display numeric values representative of the values on the abacus; a controller in communication with the electronic abacus display screen and adapted to select and move beads on the rods of the abacus to enable the display of selected values and the performance of calculations on the abacus; and, an electronic keyboard calculator in communication with the numeric display and the abacus display and adapted to perform addition, subtraction, multiplication and division functions, adapted to display numeric values on the abacus and on the numeric display and including keys for numbers 0–9 and for the four, mathematical functions, a decimal point key and an equal sign key.

The present invention further comprises: a multi-abacus useful for performing calculations in a number base selected from multiple number bases, the multi-abacus comprising: a frame; a plurality of rods positioned parallel to each other across the frame; a first zone bead positioned on each of at least a major portion of the rods in a first zone formed by the frame and a first divider; two second zone beads positioned on each of at least a major portion of the rods in a second zone formed by the frame, the first divider and a second divider, the second zone beads being of different colors with the second zone beads of a first color being positioned nearer the first divider than the second zone beads of a second color; and, five third zone beads positioned on each of at least a major portion of the rods in a third zone formed by the frame and the second divider, the third zone beads comprising one third zone bead of a first color and four beads of a second color, the third zone bead of the first color being located farthest from the second divider.

The invention further comprises: a personal abacus comprised of a case having a top portion and a bottom portion, the top and bottom portions being joined along one of their sides by a hinge so that the top and bottom portions may be moved between an open and a closed position; and, an abacus mounted in the lower portion so that the abacus is positioned for use when the top portion is in an open position.

BRIEF DESCRIPTION OF THE DRAWINGS

FIGS. 6(a), 6(b), 6(c), 6(d), 6(e) and 6f are illustrative of different types of abacuses, which can be displayed on the electronic screen of the electronic abacus calculator.

DESCRIPTION OF THE PREFERRED EMBODIMENTS

In the description of the Figures, the same numbers will be used to refer to the same or similar components throughout in the description of all of the Figures.

Figure 1:
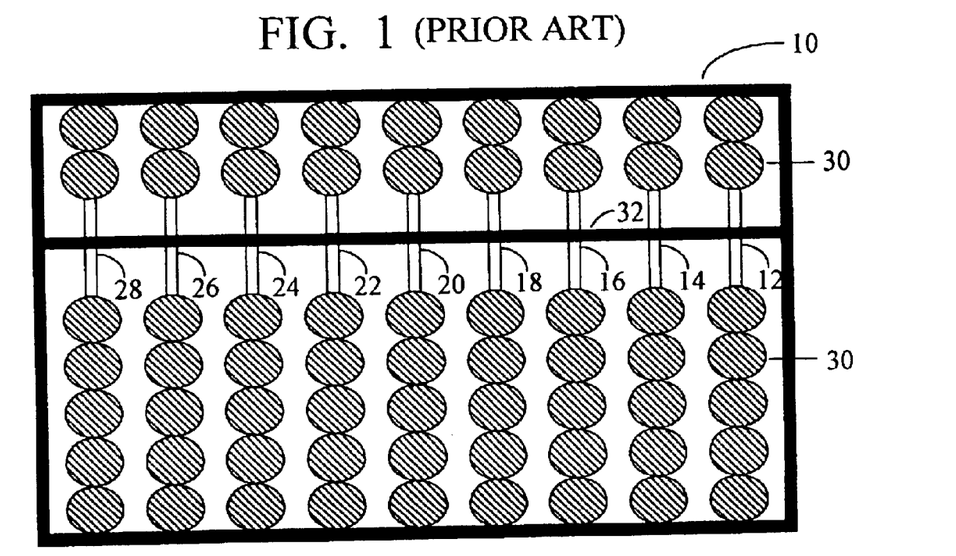
FIG. 1 schematically depicts a prior art Chinese abacus.

In FIG. 1, a conventional Chinese abacus is shown schematically. This abacus comprises a plurality of rods, each containing five beads in one section with two beads in a second section. Typically, from 9 to 27 rods may be used, although the number may vary outside these limits if desired. The Chinese abacus 10 comprises nine rods shown as rods 12–28 with five beads 30 positioned in a first section formed by the frame and a first divider 32 with two beads 30 being positioned in a second section formed by the frame and divider 32. The use of a Chinese abacus is well known to those skilled in the art and need not be discussed.

Figure 2:
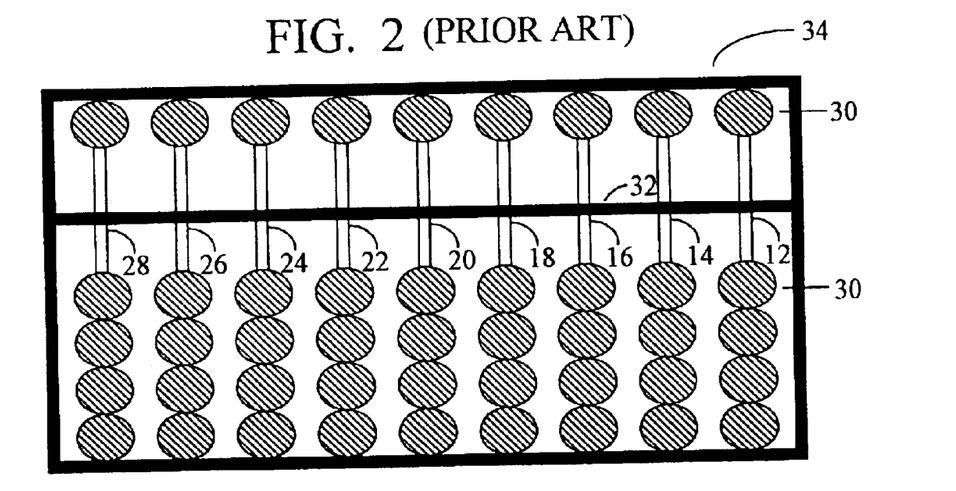
FIG. 2 schematically depicts a prior art Japanese abacus.

In FIG. 2, a Japanese abacus 34 is shown with nine rods and comprises four beads 30 in a first section formed as shown by divider 32 with one bead 30 being shown in a second section also formed by divider 32 with the abacus frame. The use of a Japanese abacus is also considered to be well known to those skilled in the art.

Figure 3:
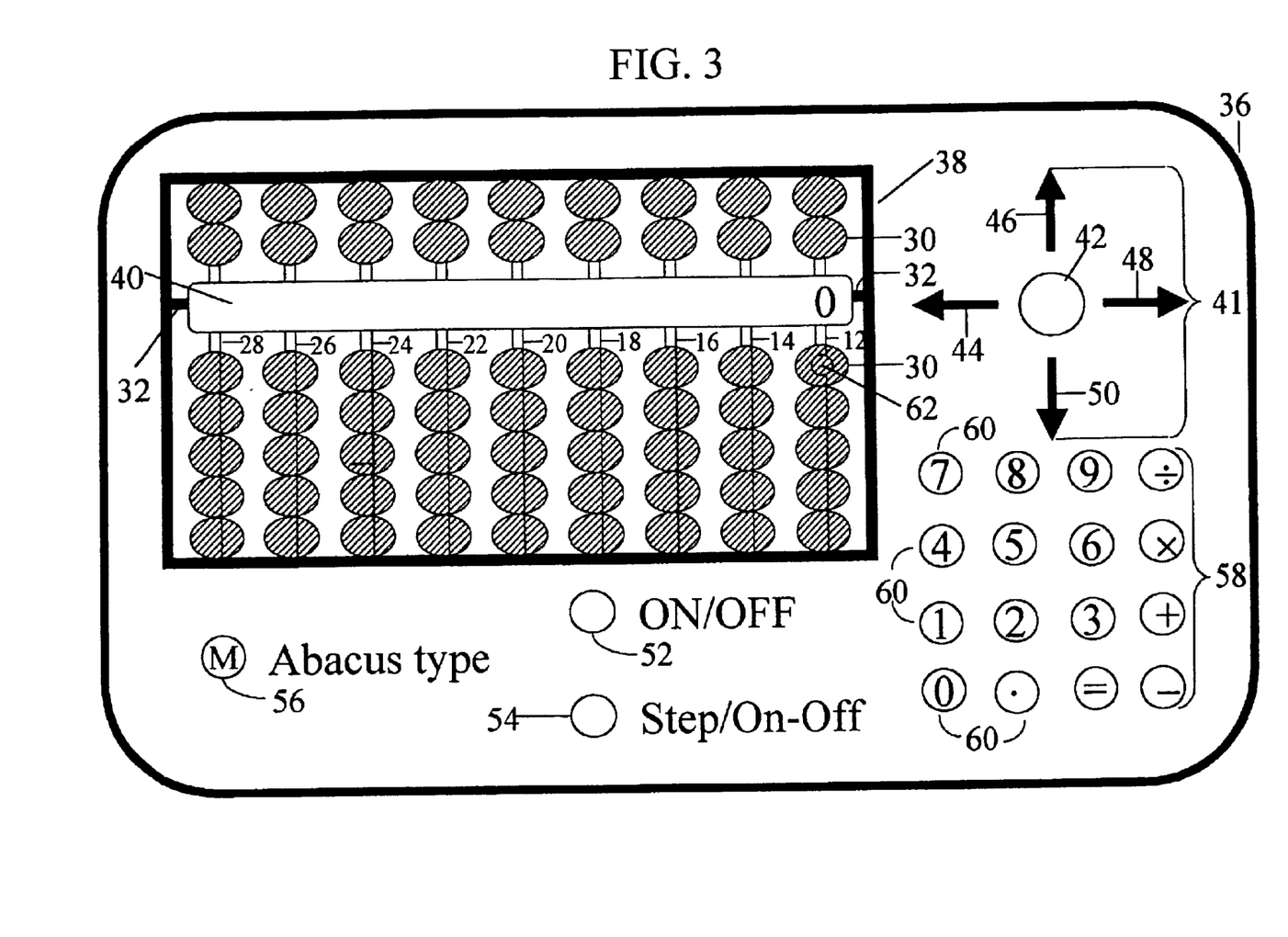
FIG. 3 is a top view of an electronic abacus calculator according to the present invention.

In FIG. 3, an electronic abacus calculator according to the present invention is shown. The calculator includes an electronic abacus display screen 38, which includes a numeric display 40. It should be understood that display 40 does not necessarily have to be positioned on the divider between the two sections of the abacus. Alternatively, a divider 32 could be used to separate the two sections of the abacus. The abacus, as shown, is configured as a Chinese abacus having five beads on each rod in the lower section with the lower section being divided from the upper section by either a divider 32 or numerical display 40. Two beads 30 are shown in the upper section.

The operation of the abacus is achieved by a controller 41, which includes the use of arrows 44, 46, 48 and 50 in combination with a bead position controller 42. A dot 62 is adapted for positioning on the desired bead to achieve the movement of the beads as desired. Arrows 44, 46, 48 and 50 move the dot 62. The bead position controller 42 moves the beads selected by the dot 62. For instance, dot 62 is readily moved to the left by the use of arrow 44 by depressing the arrow or otherwise activating the arrow. This permits the dot to be moved, for instance, to a bead on rod 14 by pressing the arrow 44 once. Additional pressing of arrow 44 moves dot 62 to rod 16, 18, 20 or the like. Similarly, the dot can be moved by arrow 50 downwardly along any given rod or upwardly along any given rod by arrow 46. Similarly, the dot can be moved to the right by arrow 48. Each time an arrow is pressed once, dot 62 moves one bead in the direction of the arrow pressed. When the dot is positioned at the desired point, the number is entered on the abacus by pressing bead position controller 42. Different controller configurations could be used.

By this technique, the abacus can be operated as usual with the number entered being displayed on numeric display 40 and with the calculation results being displayed on numeric display 40. Alternatively, calculations may be made using an electronic calculator depicted by a keyboard 58. Keyboard 58 includes keys 60, which indicate numbers 0–9, with keys also shown indicating a decimal point, equal sign, minus sign, plus sign, multiplication and division. Other keys could also be used such as are commonly used on calculators to perform functions such as square root, memory and the like. Such keyboards are well known to those skilled in the art.

According to the present invention, the keyboard 58 is shown in conjunction with the electronic abacus for use by the user as either a partial abacus calculation calculator or use as an electronic calculator. The calculator includes the standard an on/off switch 52.

According to the present invention, an abacus type selector shown as a button 56. This abacus type switch permits the selection of different types of abacuses, such as a Japanese abacus or a Chinese abacus; and permits the selection of an abacus which operations in a number base other than 10.

The step on/off switch 54 permits the selection of operation of the calculator in combination with the abacus display. In this instance, the operations entered in the calculator are shown by movement of the beads on the electronic abacus display so that each number entered is displayed and the equivalent abacus operation is displayed. These operations can be performed in this mode to illustrate each abacus step needed to implement a mathematical operation. This represents the teaching mode of the invention.

Figure 4A:
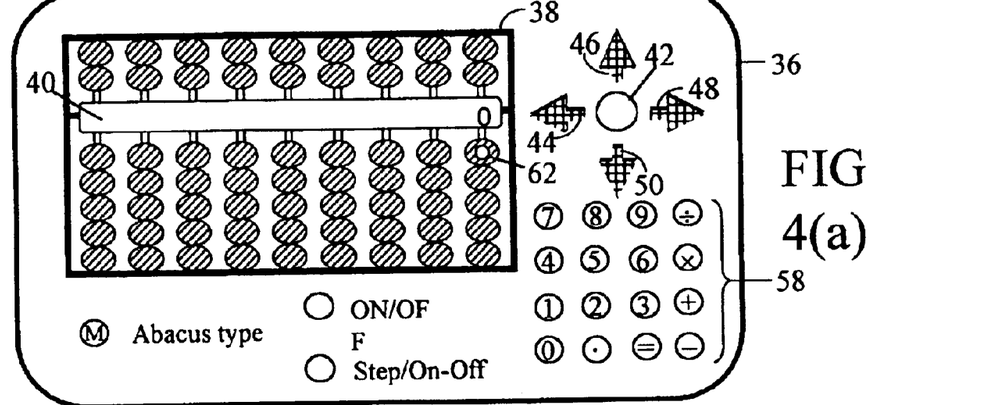
FIGS. 4(a), 4(b), and 4(c) are illustrative of the entry of numbers on a Chinese abacus on the electronic abacus calculator.
Figure 4B:
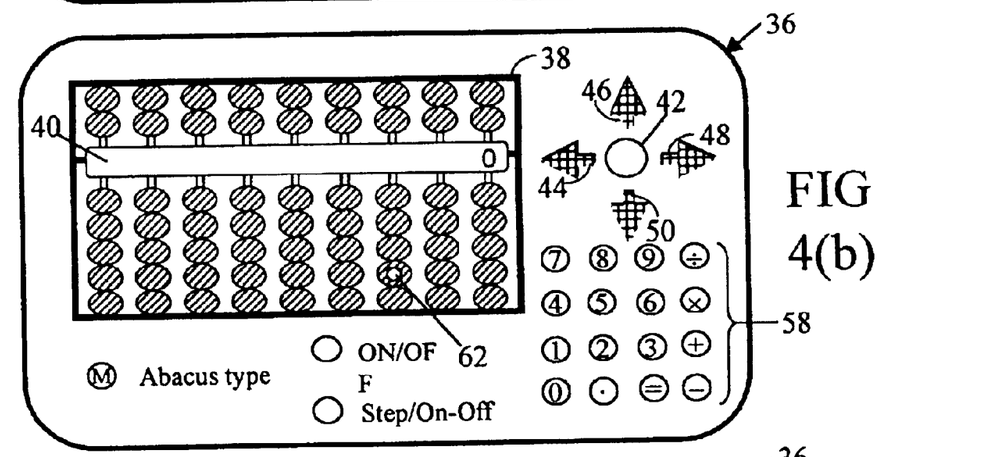
Figure 4C:
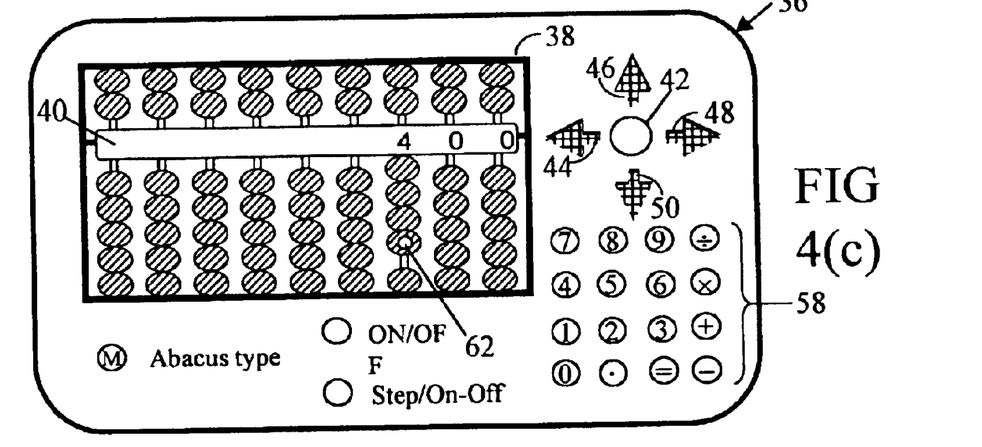

In FIGS. 4(a), 4(b), and 4(c), the entry of the number 400 is shown as a series of separate steps. For instance, in FIG. 4(a), the beads on the abacus display represent 0. In FIG. 4(b), dot 62 has been moved to the third row of beads by activating arrow 44 two times and moved downwardly to the fourth bead by activating arrow 50 three times in the row. At this point, bead position controller 42 is activated to enter the number into the electronic abacus and the beads are shown to move to the position shown in FIG. 4(c) so that the number 400 is entered. The beads positioned as in FIG. 4(c) represent the number 400. The number 400 is also displayed on the numeric display.

Figure 5A:
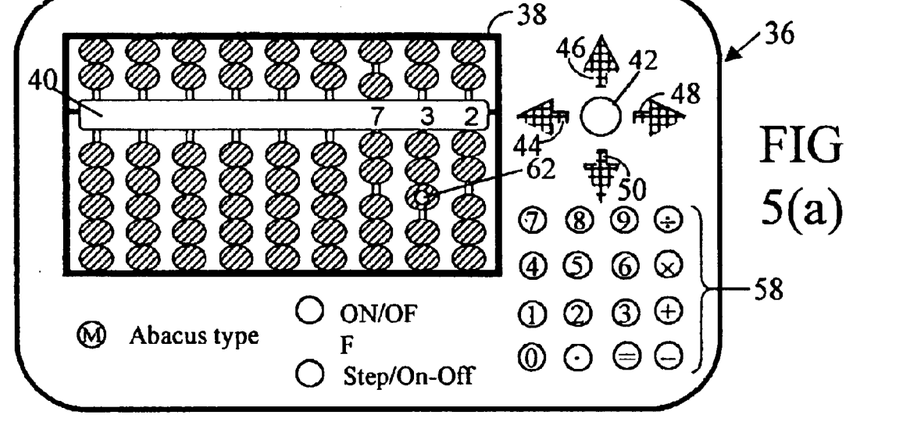
FIGS. 5(a), 5(b) and 5(c) are illustrative of the changing of a number on a Chinese abacus on the electronic abacus calculator.
Figure 5B:
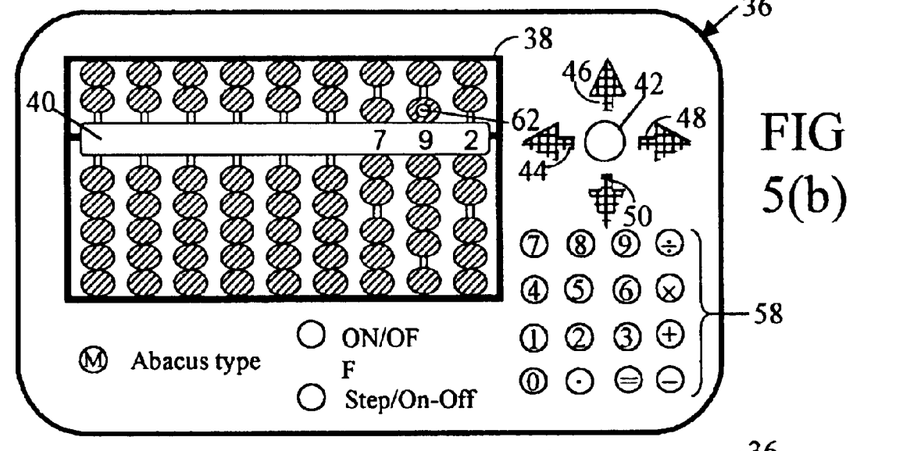
Figure 5C:
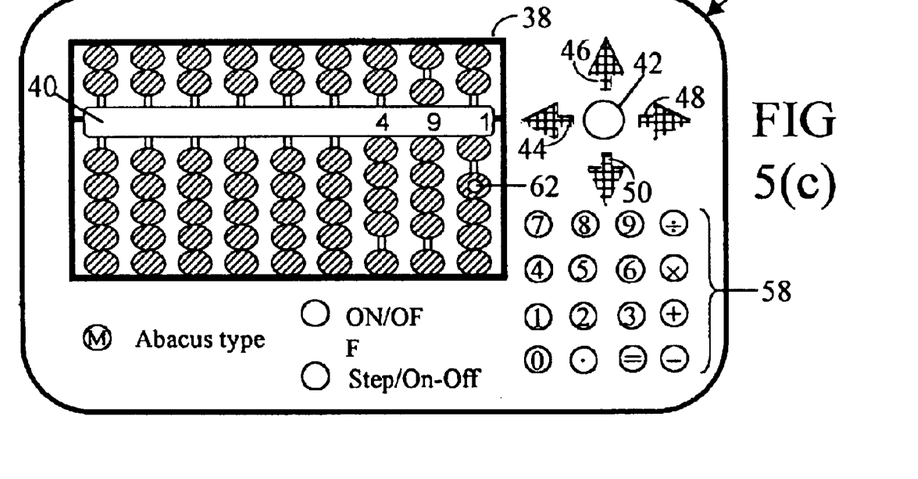

In FIGS. 5(a), 5(b), and 5(c), the operations are shown to change the number 732 to the number 491. Dot 62 initially is positioned on the third bead of the second rod, indicating a value of three on the second rod. To change the number, dot 62 is moved from the third bead to the fourth bead on the second rod by depressing arrow 50 once with bead position controller 42 then being activated. The numeric display changes from 732 to 742 (not shown). Dot 62 is then moved by activating arrow 46 four times to push the dot 62 to the first bead above the divider on the second rod. The bead position controller 42 is then activated to move this bead to the position shown in FIG. 5(b). The numeric display changes at this time from 742 to 792. Dot 62 is then moved one rod to the left by depressing arrow 44 once. The bead position controller 42 is then activated to move this bead upward and away from the divider (not shown). The numeric display would now read 292. Dot 62 is then moved to the fourth bead in the lower section on the third rod by depressing arrow 50 four times and entered by activating bead position controller 42. The numeric display row reads 492 (not shown). Depressing arrow 48 twice moves dot 62 to the fourth bead on first rod (rod 12, FIG. 3). Depressing arrow 46 two times moved dot 62 onto the second bead of first rod. The bead position controller 42 is now activated, moving one bead away from numeric display 40. The resulting configuration is shown in FIG. 5(c), where the numeric display 40 shows a value of 491 with the beads positioned to reflect the number 491.

Figure 6A:
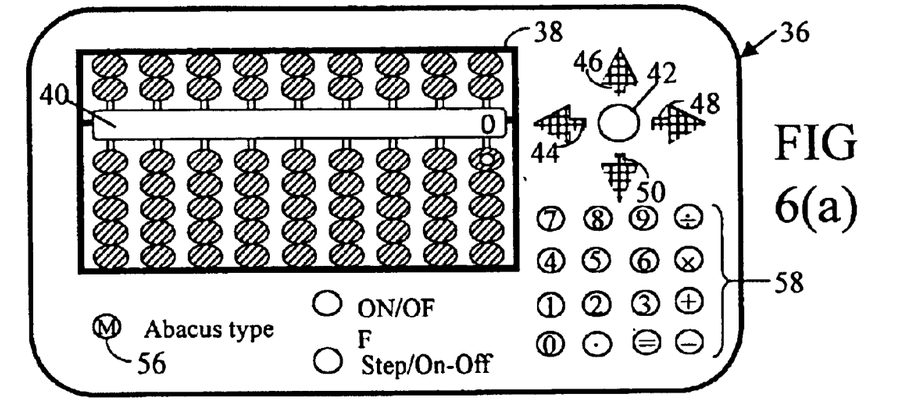
FIG. 6(a) depicts a Chinese abacus for base-ten number calculations.
Figure 6B:
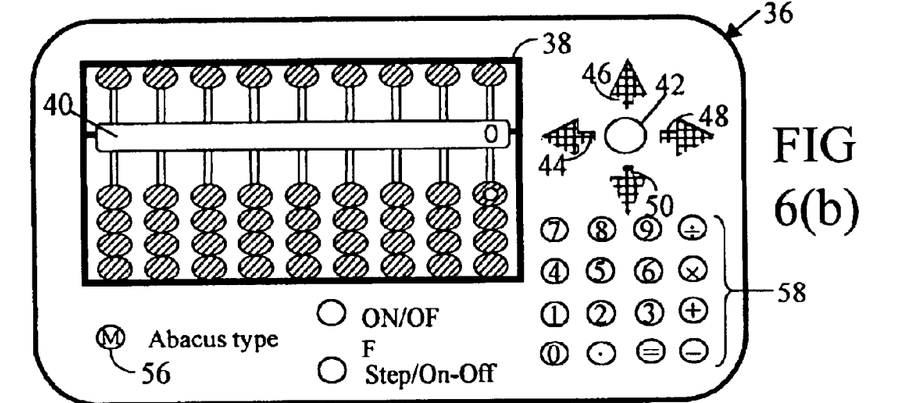
FIG. 6(b) depicts a Japanese abacus.
Figure 6C:
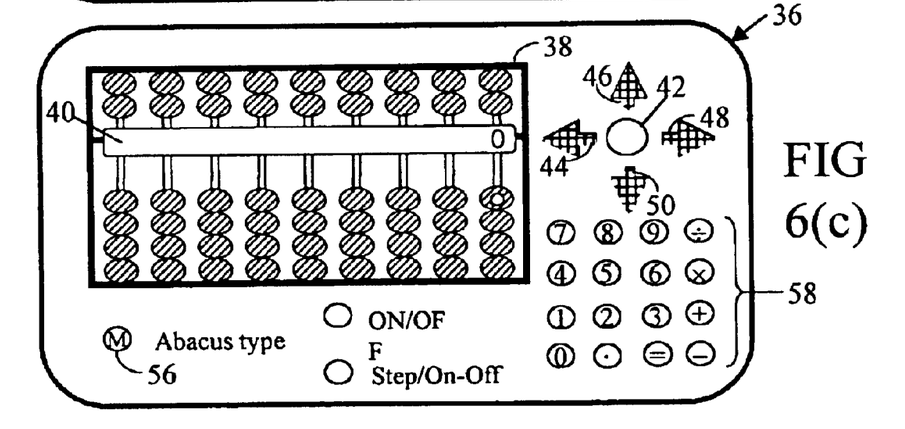
FIG. 6(c) demonstrates a Chinese abacus for base-four calculations.
Figure 6D:
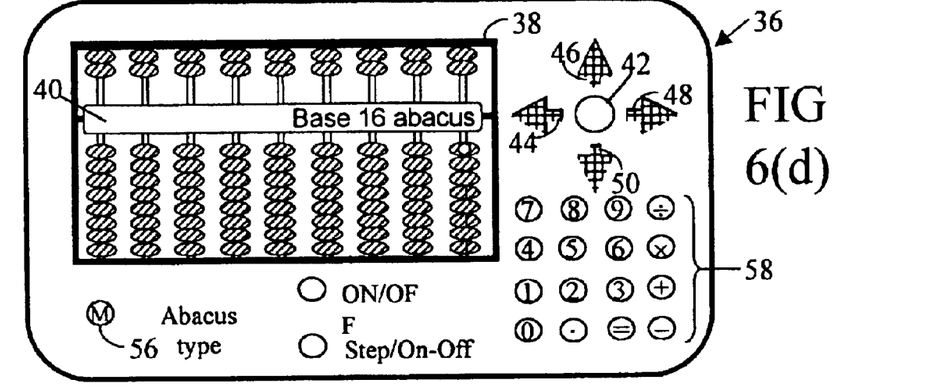
FIG. 6(d) demonstrates a Chinese abacus for base-sixteen calculations.
Figure 6E:
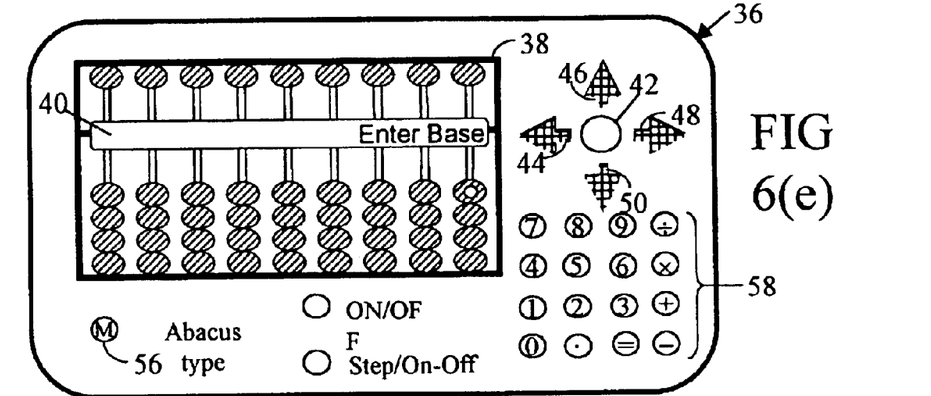
FIG. 6(e) demonstrates an abacus display requesting entry of the number base to be displayed.
Figure 6F:
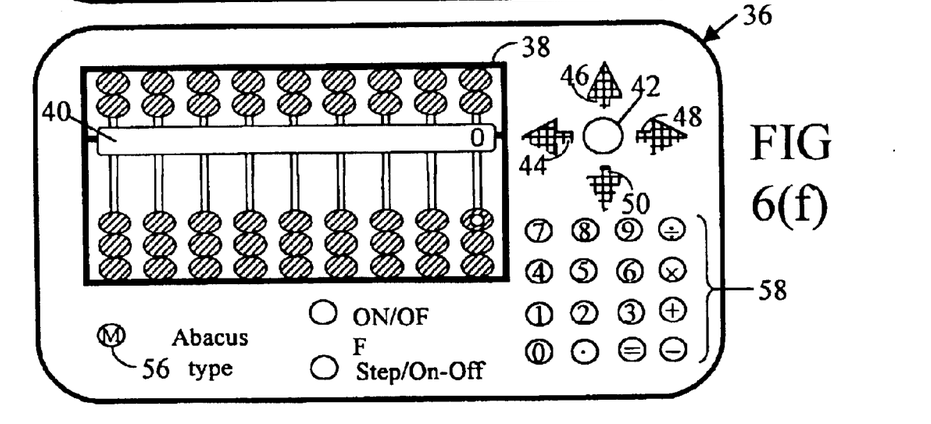
FIG. 6(f) illustrates a Chinese abacus for base-three calculations.

In FIGS. 6(a), 6(b), 6(c), 6(d), 6(e) and 6(f), a plurality of abacus modes are shown. These modes are selectable by pushing the abacus-type button 56. Depressing button 56 causes these changes. In FIG. 6(a), a conventional Chinese abacus is shown. Pressing button 56 results in the display shown in FIG. 6(b), which is a conventional Japanese abacus. In FIG. 6(c), a Chinese abacus configured for use for a base-four number system. Pressing button 56 again displays a Chinese abacus configured for a base-sixteen number system as shown in FIG. 6(d). FIG. 6(e) shows a configuration where the electronic calculator has inquired as to which base is desired. In FIG. 6(f), a Chinese abacus configured for performing base-six number system calculations is shown.

The teaching mode of the electronic calculator is demonstrated in FIG. 7 and is activated by depressing the step/on-off button 54. To demonstrate the use of this feature, the multiplication of the number 75 by the number 81 will be shown. First the step on/off button 54 is pushed once. Either the numeric keypad 58 or the controller 41 has been used to enter the number 75. Before the number 81 is entered, the "⊗" key is pushed to indicate multiplication is to be performed which positions the number 75 as shown in FIG. 7(a).

Figure 7A:
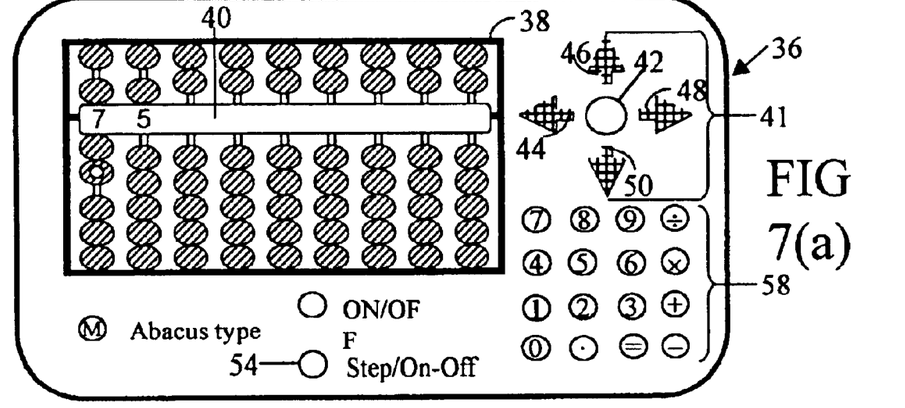
FIGS. 7(a), 7(b), 7(c), 7(d), 7(e), and 7(f) depict the steps used with a Chinese abacus in the multiplication of the number 75 and 81 on the electronic abacus calculator.
Figure 7B:
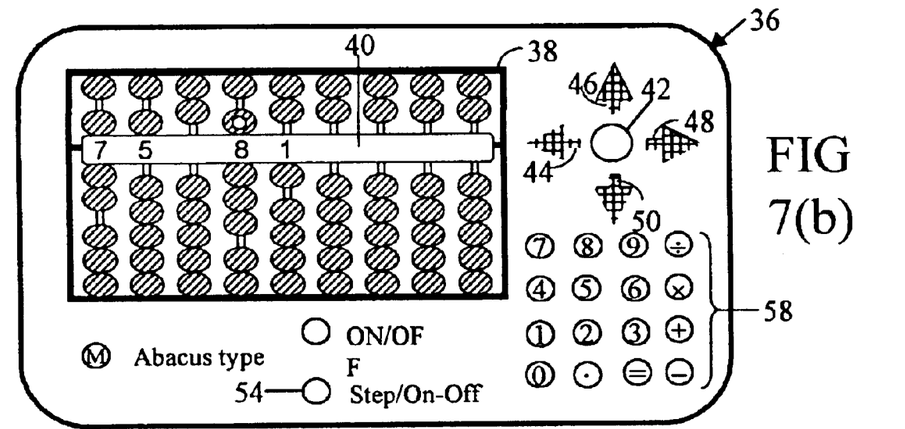
Figure 7C:
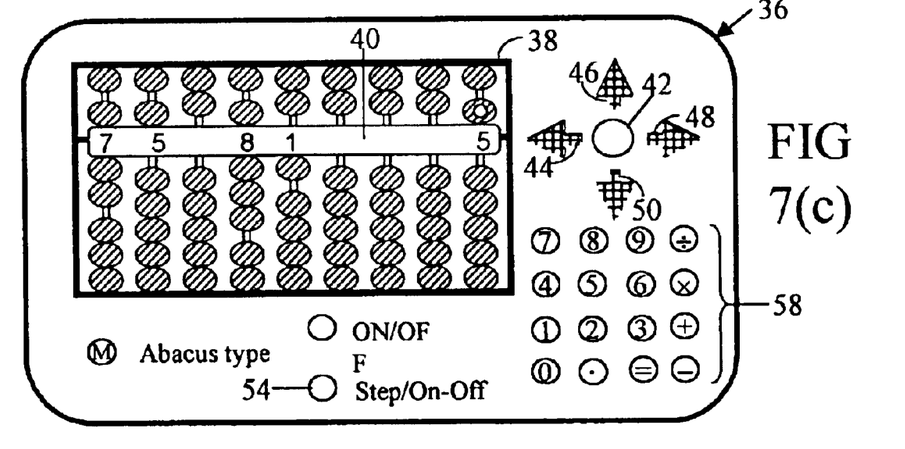
Figure 7D:
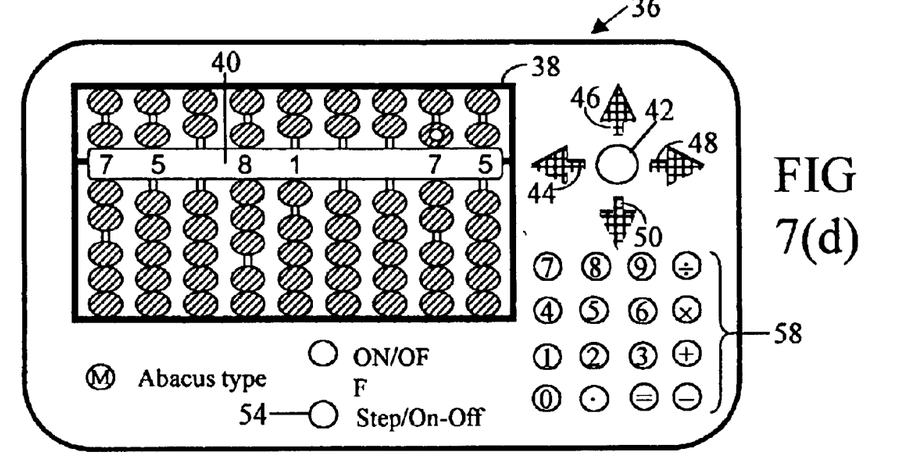

If the number 81 is entered using the bead position controller, the number 81 is placed one rod to the right of the number 75. If it is entered using the numeric keyboard, selecting a mathematical operator "⊗" causes the calculator to place the number 81 in this position also. This result is shown in FIG. 7(b). Pushing the "⊖" key starts the step-by-step calculation. The display in FIG. 7c shows one bead moved as a result of multiplying 5 from the 75 by the 1 from the 81 giving a 5. Nothing further will happen until the "⊖" key is pushed again. In FIG. 7(d), the "⊖" key has been pushed again. The 1 is multiplied by the 7 and the product is placed on the correct rod with the appropriate beads being moved. The result is as shown in 7(d).

Figure 7E:
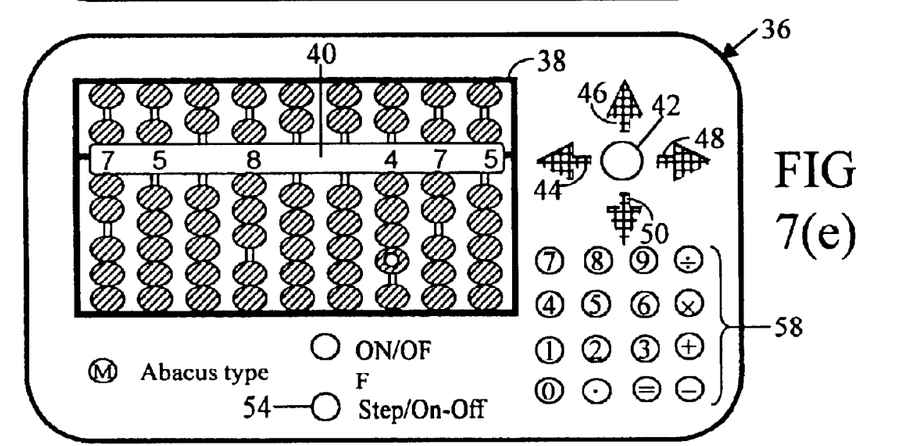
Figure 7F:
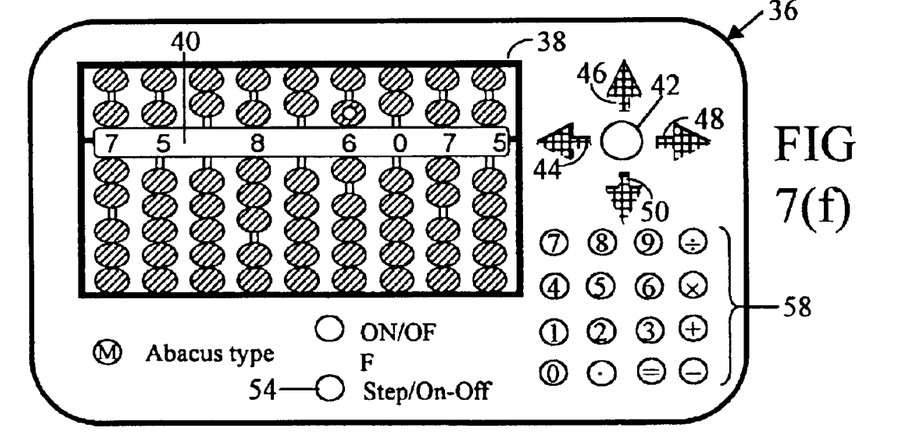

The "⊖" key is pressed again. The 1 is removed from the display since it is no longer needed, and the rod maybe needed if the result is a larger number. The 8 (really 80) is first multiplied by the 5 of 75, which is 400. The 400 is added to make 475, which is a total and which is shown on the numeric display and on the beads. This total is shown in FIG. 7e. Pressing the "⊖" key again multiplies 8 times 7 to give 56 (really 5600), which is added to the 4 in the number 475 to give the correct answer of 6,075 shown in FIG. 7f. Pushing the "⊖" key against causes the 75 and the 8 to disappear and the calculation is finished. It will be readily appreciated by those skilled in the art that the stepwise calculation as shown above is very beneficial to students who are learning the basics of multiplication, addition, subtraction or division. The calculation demonstrated by the movement of the beads give added insight into the mechanics of mathematical calculations.

Further the use of the electronic abacus permits the user to make basic calculations on the abacus without use of the numeric keyboard 58. In either event, the result is displayed on the abacus by the positioning of the beads and in the numerical display.

The electronic equipment available to construct the electronic abacus calculator is well known to those skilled in the art and need not be discussed in detail. A wide variety of techniques similar to those used in the construction of the electronic abacus are well known to those skilled in the art and are used frequently in calculational, recreational, or other electronic devices.

According to the present invention, an electronic abacus calculator is provided which uses an electronic display screen to permit the use of an abacus to perform simple calculations and allows use of the screen in combination with an electronic keyboard to perform more complex calculations or to provide educational assistance to students who may be learning the basics of mathematical operation by allowing the students to observe the operation of the abacus in combination with electronic keyboard. Calculations are allowed in numeric bases beyond the usual base 10 calculations, either in abacus mode or electronic keyboard mode.

Figure 8:
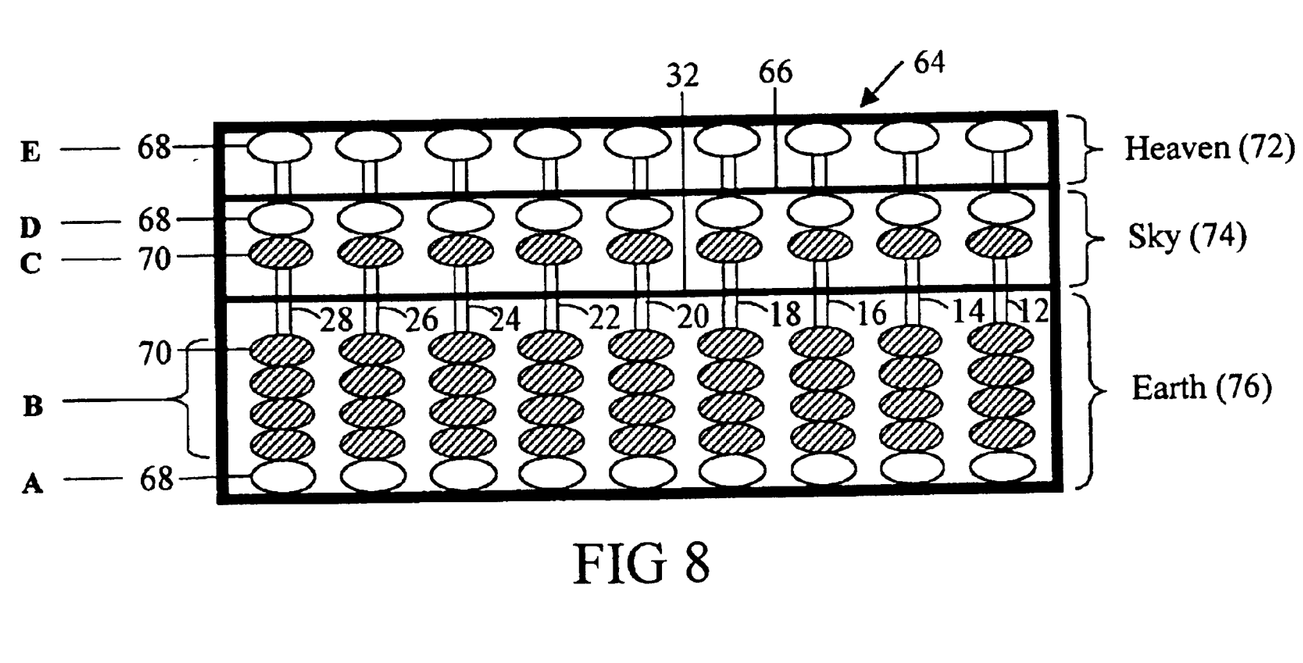
FIG. 8 schematically shows a multi-abacus, which includes a middle section, which facilitates the use of the multi-abacus for different number base calculations.

A further variation of an abacus is shown in FIG. 8. In this Figure, an abacus designed to perform calculations in number systems using a base-two, four, eight and sixteen are shown. The dark beads constitute a traditional Japanese base-ten abacus. The sky (74) and earth (76) registers are a traditional Chinese base-ten abacus. Binary operations can be done with the heaven (72) register alone.

Base-four operations can be done with the heaven and sky registers. The heaven beads have twice the value of the sky beads on the same rod. For example, a sky bead on rod 12 would have the value of one and the heaven bead would have a value of two on the same rod.

Base-eight operations can be done with the dark beads. The sky beads have four times the value of the earth beads on the same rod. For example, earth beads on rod 12 would have a value of one and the sky beads would have a value of four on the same rod.

Base-sixteen operations can be done with the heaven and sky registers and the dark beads of the earth register. The heaven beads have twice the value of a sky bead, which has four times the value of a dark earth bead. For example, on rod 12, the dark earth bead would have a value of one, each sky bead would have a value of four, and the heaven beads would have a value of eight.

This abacus can perform calculations in a wide range of number bases, which are beyond the capability of a conventional abacus. The addition of a sky section provides the added capability. The use of the colored beads also presents the opportunity to use the beads in the abacus in different fashions.

Figure 9:
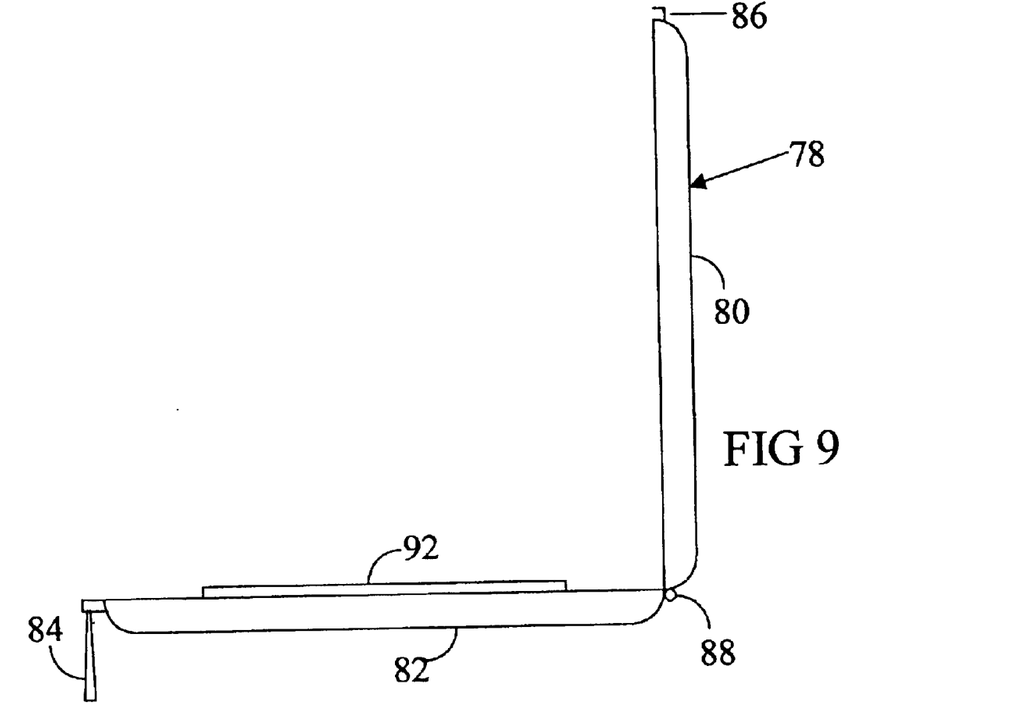
FIG. 9 schematically shows an abacus positioned in a carrying case which is adapted to open to provide a useable surface for use of the abacus; and, FIG. 10 shows a top view of the useable surface of the bottom portion of the carrying case shown in FIG. 9.

In FIG. 9, a case 78 is shown for use to permit the use of an abacus as a laptop calculator. The case 78 comprises a top 80 and bottom 82 which are hinged at a hinge 88 so that they can rotatably open to provide a case having a laptop surface 91 containing an abacus 92 which can be used by a user as a laptop computer or laptop. The abacus may be positioned as shown at 92. The case also includes a latch 86, as known to those skilled in the art, for use to close the top and bottom and a handle 84 so that the closed case can readily be carried.

Figure 10:
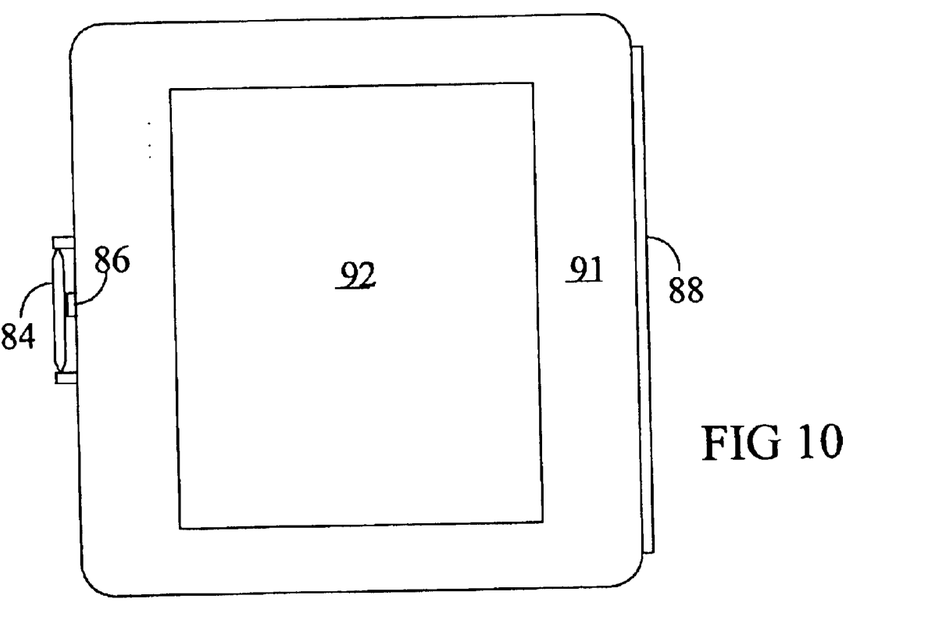

In FIG. 10, a top view of the bottom portion 82 is shown. The abacus area 92 is shown and is configured to contain the particular abacus selected for use. The abacus used in the case maybe Japanese, Chinese, multi-abacus, or an electronic abacus calculator as described above. This permits the ready transportation of the abacus for use, for instance in planes, office environments where the user maybe located in a single office or may be required to move from office to office with some frequency. The case maybe formed of walnut or other decorative wood, plastic or other suitable materials. The fabrication of such cases for use to transport personal computers, calculators and the like is well known to those skilled in the art.

Having described the abacus of the present invention by reference to certain of its preferred embodiments, it is respectfully pointed out that the embodiments described are illustrative rather than limiting in nature and that many variations and modifications may be considered obvious and desirable to those skilled in the art based upon a review of the foregoing description of preferred embodiments.

Having thus described the invention, I claim:

1. A multi-abacus useful for performing calculations in a number base selected from multiple number bases, the multi-abacus comprising:
   a) a frame;
   b) a plurality of rods positioned parallel to each other across the frame;
   c) a first zone bead positioned on each of at least a major portion of the rods in a first zone formed by the frame and a first divider;
   d) two second zone beads positioned on each of at least a major portion of the rods in a second zone formed by the frame, the first divider and a second divider, the second zone beads being of different colors with the second zone beads of a first color being positioned nearer the first divider than the second zone beads of a second color; and,
   e) five third zone beads positioned on each of at least a major portion of the rods in a third zone formed by the frame and the second divider, the third zone beads comprising one third zone bead of a first color and four beads of a second color, the third zone bead of the first color being located farthest from the second divider wherein the beads are colored and positioned so that the beads used with a particular number base can be readily identified.

2. The multi-abacus of claim 1 wherein the first zone bead, the second zone bead of a first color and the third zone bead of a first color are the same color.

3. The multi-base abacus of claim 1 wherein the second zone bead nearer the first divider and the other second zone bead are of contrasting colors.

4. The multi-abacus of claim 1 wherein the third zone bead of a first color and the other third zone beads are of contrasting colors.

5. The multi-abacus of claim 1 wherein the first zone beads are positioned to perform base two calculations.

6. The multi-abacus of claim 1 wherein the first zone beads and the two second zone beads are positioned for use to perform base four calculations.

7. The multi-abacus of claim 1 wherein the second zone beads nearest the second divider and the four third zone beads nearest the second divider are positioned for use to perform base eight calculations.

8. The multi-abacus of claim 1 wherein the first zone beads, the two second zone beads and the four third zone beads nearest the second divider are positioned for use to perform base sixteen calculations.

9. A multi-abacus useful for performing calculations in a number base selected from multiple number bases, the multi-abacus consisting essentially of:
   a) a frame;
   b) a plurality of rods positioned parallel to each other across the frame;
   c) one first zone bead positioned on each of at least a major portion of the rods in a first zone formed by the frame and a first divider;
   d) two second zone beads positioned on each of at least a major portion of the rods in a second zone formed by the frame, the first divider and a second divider, the second zone beads being of different colors with the second zone beads of a first color being positioned nearer the first divider than the second zone beads of a second color; and,
   e) five third zone beads positioned on each of at least a major portion of the rods in a third zone formed by the frame and the second divider, the third zone beads comprising one third zone bead of a first color and four beads of a second color, the third zone bead of the first color being located farthest from the second divider wherein the beads are colored and positioned so that the beads used with a particular number base can be readily identified.

10. The multi-abacus of claim 9 wherein the first zone bead, the second zone bead of a first color and the third zone bead of a first color are the same color.

11. The multi-base abacus of claim 9 wherein the second zone bead nearer the first divider and the other second zone bead are of contrasting colors.

12. The multi-abacus of claim 9 wherein the third zone beads of a first color and the other third zone beads are of contrasting colors.

13. The multi-abacus of claim 9 wherein the first zone beads are position ed to perform base two calculations.

14. The multi-abacus of claim 9 wherein the first zone beads and the two second zone beads are positioned for use to perform base four calculations.

15. The multi-abacus of claim 9 wherein the second zone bead nearest the second divider and the four third zone beads nearest the second divider are positioned for use to perform base eight calculations.

16. The multi-abacus of claim 9 wherein the first zone beads, the two second zone beads and the four third zone beads nearest the second divider are positioned for use to perform base sixteen calculations.

17. A method for performing calculations in a number base selected from multiple number bases using a multi-abacus comprising: a) a frame; b) a plurality of rods positioned parallel to each other across the frame; c) a first zone bead positioned on each of at least a major portion of the rods in a first zone formed by the frame and a first divider; d) two second zone beads positioned on each of at least a major portion of the rods in a second zone formed by the frame, the first divider and a second divider, the second zone beads being of different colors with the second zone beads of a first color being positioned nearer the first divider than the second zone beads of a second color; and, e) five third zone beads positioned on each of at least a major portion of the rods in a third zone formed by the frame and the second divider, the third zone beads comprising one third zone bead of a first color and four beads of a second color, the third zone bead of the first color being located farthest from the second divider, the method consisting essentially of:
  a) selecting beads positioned on at least some of the rods in at least some of the zones with the beads being positioned to function as an abacus for a selected number base; and
  b) performing calculations on the abacus for the selected number base in the selected number base wherein the beads are colored and positioned so that the beads used with a particular number base can be readily identified.

18. The method of claim 17 wherein the first zone beads are used to perform binary calculations.

19. The method of claim 18 wherein the first zone beads, the two second zone beads and the four third zone beads nearest the second divider are used to perform base sixteen calculations.

20. The method of claim 17 wherein the first zone beads and the two second zone beads are used to perform base four calculations.

21. The method of claim 17 wherein the second zone beads nearest the second divider and the four third zone beads nearest the second divider are used to perform base eight calculations.

* * * * *